(No Model.)
H. A. BARNARD.
Conveyer.
No. 241,278.          Patented May 10, 1881.
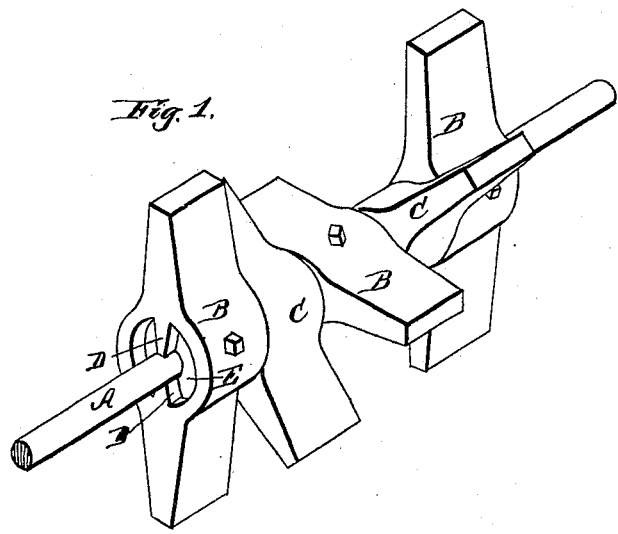
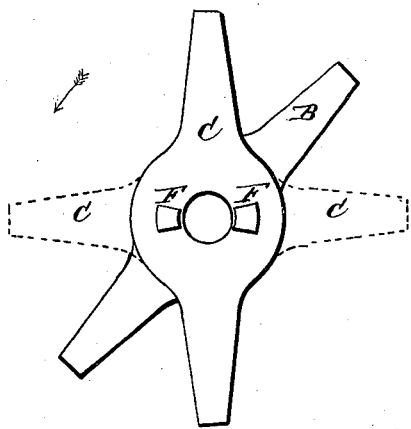
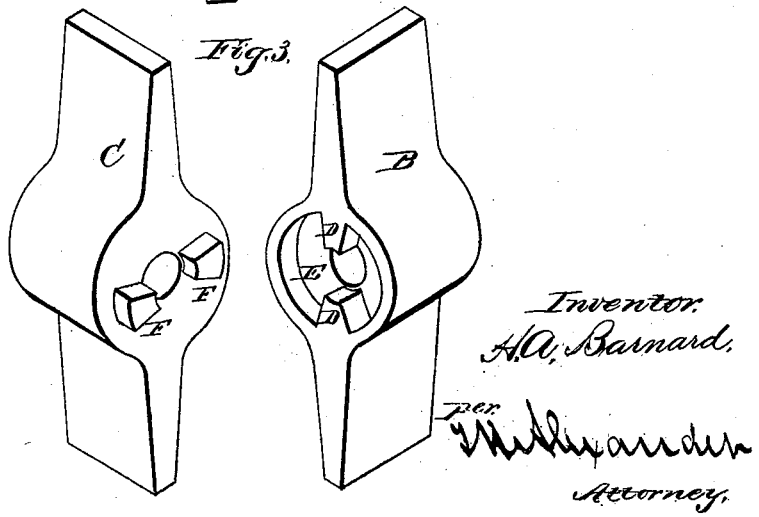
Witnesses:
W. C. McArthur,
Jerry Visser
Inventor:
H. A. Barnard,
per M. Alexander,
Attorney.

UNITED STATES PATENT OFFICE.

HEMAN A. BARNARD, OF MOLINE, ILLINOIS, ASSIGNOR TO THE BARNARD & LEAS MANUFACTURING COMPANY, OF SAME PLACE.

CONVEYER.

SPECIFICATION forming part of Letters Patent No. 241,278, dated May 10, 1881.

Application filed March 23, 1881. (No model.)

*To all whom it may concern:*

Be it known that I, HEMAN A. BARNARD, of Moline, in the county of Rock Island and State of Illinois, have invented certain new and useful Improvements in Conveyers; and I do hereby declare that the following is a full, clear, and exact description thereof, reference being had to the accompanying drawings, and to the letters of reference marked thereon, which form part of this specification.

This invention relates to certain improvements in that class of apparatus known as "screw-conveyers," which are commonly employed in grain-cleaners, ore-separators, and other apparatus for operating upon granular or granulated material, for feeding such material to or discharging it from the apparatus, and which conveyers consist, essentially, of a series of blades arranged spirally upon a rotary shaft located in a suitable conductor; and the object of the present invention is to provide a means whereby the grain or other material may be conveyed or carried in one direction only, irrespective of the direction of the rotation of the screw-shaft, and thus prevent the material from being diverted from its proper course in case the apparatus is started in the wrong direction accidentally, or when, from other causes, it may be found convenient to reverse the movements of the apparatus.

The above-mentioned objects I attain by the mechanism and devices illustrated in the accompanying drawings, in which—

Figure 1 is a perspective view of my device; Fig. 2, an end view of the same, and Fig. 3 a perspective view of two adjoining sections of the conveyer-arms.

The letter A indicates the shaft of the conveyer, which may be of any desired length and diameter, according to the particular purpose for which it is required.

At suitable intervals, and at right angles to each other, are rigidly secured the blades B, which may be keyed, or fastened by means of set-screws, or otherwise.

Between each of the blades B, and arranged alternately therewith, are located the loose blades C, which are capable of a quarter-rotation on said shaft. The movement of the said loosely-mounted blades is limited by lugs D, which set in recesses E in the stationary blades, and are engaged by the lugs F in said recesses. The movable blades, when in a working position, are alternately at right angles with each other, and at an angle of forty-five degrees to the stationary blades.

The operation of my improved conveyer is as follows: When turned in one direction the loose blades are caused, by the weight of the material, to fall into such position as to form, say, a right-hand screw, which carries the material forward. When turned in the opposite direction the positions of the movable blades will be automatically reversed, forming a left-hand screw, which will convey the grain or other material in the same direction, as is evident.

Having thus described my invention, what I claim, and desire to secure by Letters Patent, is—

1. A conveyer-screw consisting of a rotary shaft having a series of rigidly-secured blades and a series of alternate movable blades, the latter of which are adapted to automatically adjust themselves as the direction of rotation is changed and form a right or left screw, substantially as specified.

2. In combination with the fixed blades and the recesses provided with engaging-lugs, the movable blades provided with lugs adapted to engage the lugs in the recesses, whereby the movement of the loose blades is limited, substantially in the manner and for the purpose specified.

In testimony that I claim the foregoing as my own I affix my signature in presence of two witnesses.

HEMAN A. BARNARD.

Witnesses:
J. SILAS LEAS,
J. B. CORNWALL.